United States Patent [19]

Toman

[11] 4,027,289
[45] May 31, 1977

[54] OPERATING CONDITION DATA SYSTEM

[76] Inventor: Donald J. Toman, 24 Old Farm Road, Pleasantville, N.Y. 10570

[22] Filed: June 26, 1975

[21] Appl. No.: 590,406

[52] U.S. Cl. .......................... 340/172.5; 340/151; 340/27 R; 343/100 AP
[51] Int. Cl.² .................. G06F 15/48; G06F 15/50
[58] Field of Search ............ 340/151, 27 R, 27 NA, 340/172.5; 343/175, 100, 108; 445/1

[56] References Cited

UNITED STATES PATENTS

| | | | |
|---|---|---|---|
| 3,665,417 | 5/1972 | Low et al. | 340/172.5 |
| 3,665,439 | 5/1972 | Brummer et al. | 340/27 R X |
| 3,702,989 | 11/1972 | Provenzano et al. | 340/172.5 |
| 3,737,858 | 6/1973 | Turner et al. | 340/151 |
| 3,760,377 | 9/1973 | Attridge et al. | 340/172.5 |
| 3,818,476 | 6/1974 | Coulter et al. | 343/100 AP |
| 3,858,181 | 12/1974 | Goldsby et al. | 340/150 |
| 3,866,175 | 2/1975 | Seifert et al. | 340/152 R |

*Primary Examiner*—Mark E. Nusbaum
*Attorney, Agent, or Firm*—Curtis Ailes

[57] ABSTRACT

Separate operating condition data measurement sub-systems are provided for each of a plurality of navigation signal transmitters, each sub-system including its own microprocessor and data store, with the data being collected and stored in a collective data store for a plurality of sub-systems, and interconnections being provided to a remote central station computer, data processing capability being provided by the microprocessor in the sub-system, by a data processor associated with the collective data store, and by the central station computer, with a predetermined division of data processing functions.

26 Claims, 2 Drawing Figures

FIG. 1

FIG. 2

OPERATING CONDITION DATA SYSTEM

CROSS REFERENCES TO RELATED CASES

All of the following related U.S. patents and patent applications are assigned to the same assignee as the present application:

U.S. Pat. No. 3,820,074 issued June 25, 1974 to Donald J. Toman for REMOTE OPERATING CONDITION DATA ACQUISITION SYSTEM.

U. S. Pat. No. 3,818,476 issued June 18, 1974 to J. Roland Coulter, Warren Hundley, and Sol N. Koblick for NAVIGATION AID TRANSMITTER-MONITOR SYSTEM.

U. S. Pat. No. 3,806,935 issued Apr. 23, 1974 to Donald J. Toman for RADIO NAVIGATIONAL AID WITH SEPARATE STANDARD FREQUENCY SIGNAL.

U. S. patent application Ser. No. 546,461 filed Feb. 3, 1975 by J. Roland Coulter and Arthur E. Fuerherm for OPERATING CONDITION DATA COMMUNICATION SYSTEM.

The present invention relates to operating condition data systems which are particularly useful in recording, transmitting, and processing operating condition data relating to navigation signal transmitters for radio navigational aids for craft such as aircraft.

In many radio transmitter applications, and particularly in radio navigational aid transmitters, it is absolutely vital that the signals which are emitted by the transmitter must be reliable and accurate, and the signals must not be false or erroneous, such as to provide inaccurate or incorrect navigation information. For instance, the present invention is particularly useful in conjunction with instrument landing systems in which radio signals are used to define a specific guidance path which is to be followed by the aircraft, usually in a "blind" approach to a runway of a landing field. If the signals are inaccurate, the aircraft may be misguided.

In order to assure continuous and accurate operation of such transmitters, it has been common procedure in the past to supervise the operation of such transmitters at intervals which are as frequent as possible by having a technician visit the site of the transmitter and take operating readings indicative of the operating conditions of the various parts of the transmitter. It has also been the custom to continuously monitor the output signals of the transmitter to determine whether those signals are within acceptable limits of accuracy, and to automatically shut down the transmitter if the signals depart from accepted limits of accuracy. However, one of the problems of such prior practice has been that after the monitor receiver has shut down the transmitter, it is often difficult to determine why the transmitter signals were out of limits, and what caused the malfunction of the transmitter.

New proposals have recently been introduced for the purpose of greatly reducing the cost of supervision of such navigation aid signal transmitters by providing measurement systems which are capable of making operating condition measurements automatically, and causing those measurements to be transmitted from time to time to a central station for recordation and analysis. The central station is remote from the navigation aid signal transmitter, and thus, one central station can supervise many transmitters. Such systems are described and claimed in U. S. Pat. No. 3,820,074 issued June 25, 1974 to Donald J. Toman for REMOTE OPERATING CONDITION DATA ACQUISITION SYSTEM and in U. S. patent application Ser. No. 546,461 filed Feb. 3, 1975 by J. Roland Coulter and Arthur E. Fuerherm for OPERATING CONDITION DATA COMMUNICATION SYSTEM.

The present invention generally relates to remote collection of operating condition data and remote supervision systems of the above description.

It is one important object of the present invention to provide, at a very limited cost, an operating condition data system for remote supervision of the operation of a plurality of navigation signal transmitters which provides substantially improved data gathering and storing capability with a minimum requirement for the quantity of data which must be transmitted from each individual navigation aid transmitter to the central station.

It is a continuing problem in supervision of a navigation aid transmitter, either by a human technician, or by a remote data gathering system, to interpret the meaning and relevance of the data, and to detect subtle changes and trends in changes in the operating data which might be used as a basis for predicting future system malfunctions.

Accordingly, it is another important object of the present invention to provide an improved operating condition data system which provides an optimum in system data analysis capability with a minimum requirement for transmission of data to a central station for analysis at the central station.

Another object of the invention is to minimize the requirement for transmission of data from the transmitter which is being supervised in order to avoid the expense of high speed data line capability.

Another problem in connection with the supervision of such navigation signal transmitters is that after the monitor detects an out of limits signal (monitor alarm condition) and disables the transmitter, it is difficult to determine what caused the monitor alarm condition. An important step in the direction of improving the quality of information about monitor alarm conditions was disclosed in the prior U. S. Pat. No. 3,820,074 previously mentioned above. In that improvement, before the monitor alarm signal is premitted to disable the transmitter, a complete set of data is taken to record the operating conditions of the transmitter. Unfortunately, this set of data is sometimes inadequate to disclose the nature of the problem which caused the monitor alarm. It is believed that, at least occasionally, the condition causing the monitor alarm is transient in nature, and has actually disappeared by the time the set of data is taken in response to the monitor alarm.

Accordingly, it is an important object of the present invention to provide an improved operating condition data system in which operating condition data is stored at a time more nearly coinciding with the actual time of the monitor alarm condition.

Further objects and advantages of the invention will be apparent from the following description and the accompanying drawings.

In carrying out the invention there may be provided a system comprising a plurality of navigation aid transmitters, a separate operating condition data measurement sub-system for each of said transmitters, each of said sub-systems including a multiplex switch means connected to the associated transmitter for taking a plurality of operating condition measurements in sequence in the form of analog voltage signals, an analog to digital converter for converting said analog signals to digital signals, means for receiving and collectively storing said digital signals from all of said sub-systems, data transmission channel means connected from said sub-systems to said digital signal receiving and collective storing means, a central station operable for communication with a plurality of said digital signal receiving and collective storage means, a communication channel means connected for providing communication from said digital signal receiving and collective storing means to said central station, said central station including data storage means for receiving data transmitted from said collective data storage means.

Figures 1, 2:
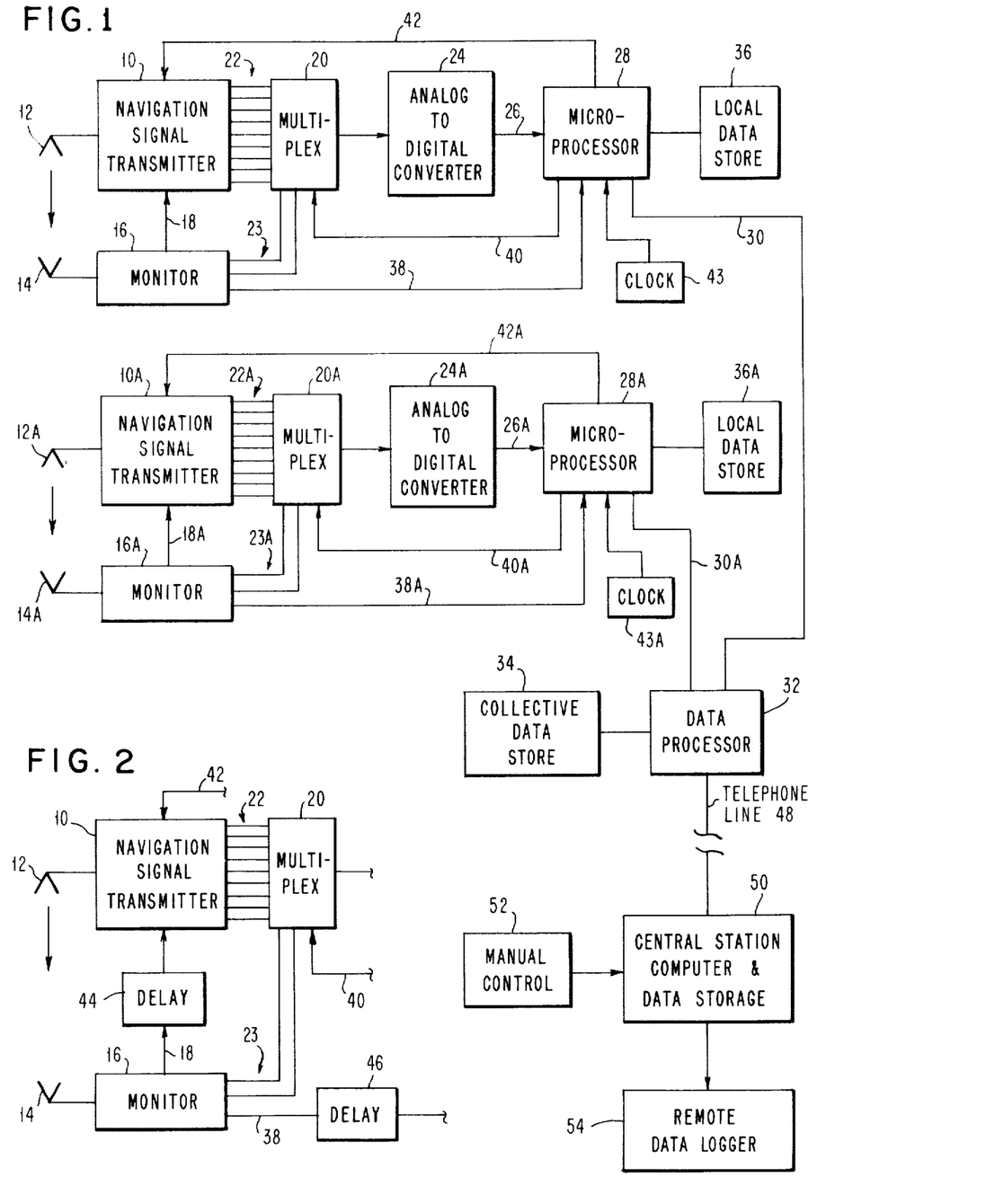
FIG. 1 is a schematic diagram illustrating a preferred embodiment of an operating condition data system in accordance with the present invention.
FIG. 2 is a partial detail illustrating a modification of the system of FIG. 1 in which delay elements have been inserted between the monitor and other system components.

Referring more particularly to FIG. 1, a navigation signal transmitter 10 is provided which may be capable of providing instrument landing system signals. Transmitter 10 may be carried out in accordance with a more detailed disclosure of such a transmitter operating at microwave frequencies described in connection with FIG. 5 of U. S. Pat. No. 3,806,935. The signals from transmitter 10 are emitted from antenna elements schematically indicated by a single antenna element 12, and are received by monitor receiver antenna elements schematically indicated by a single element 14, and thus fed to a monitor receiver 16. The monitor receiver 16 may preferably be constructed in accordance with the teachings of the prior U. S. Pat. No. 3,818,476. If the signals received by the monitor 16 deviate from the predetermined limits of acceptable performance, then a (monitor alarm) disablement signal is issued from the monitor at connection 18 to the transmitter 10 to thereby disable the transmitter 10 to prevent the issuance of inaccurate navigation signals.

The system includes a data reading means, sometimes also referred to below as an operating condition data measurement sub-system, including a multiplex switch 20 which is connected internally to a number of test points within the navigation signal transmitter 10 by connections schematically shown at 22, and to test points within the monitor 16 by connections schematically indicated at 23. Through these test point connections, the multiplex switch 20 rapidly scans, in a sequence which may be automatically repeated, successively to the different test points to measure operating conditions of the navigation signal transmitter and the monitor in terms of operating voltages at the test points. These operating voltages are connected to an analog to digital converter 24, which may be a digital voltmeter, for conversion from analog voltage form to digital form for ease in further transmission, storage, and processing of the operating condition data represented by the signals. The digital operating condition data is then supplied through connections schematically illustrated at 26 to a microprocessor 28. The microprocessor 28 includes a parallel to serial converter for converting the parallel digital signals from the analog to digital converter 24 to a train of serial pulses for ease of transmission over a connection line 30. Line 30 leads to a data processor 32 and an associated collective data store 34 which may be located remote from the transmitter 10 at a central location in the airport, such as at the control tower or airport administration building. The transmitter 10 is typically located near a particular runway which it serves.

Data processor 32 is in communication from time to time with a central station 50 through a communication link 48. These elements are described more fully below.

Preferably associated with the microprocessor 28 is a local data store 36 which receives and stores the data as it is taken.

The microprocessor 28 serves as the control element for the operating condition data measurment sub-system. In connection with this control function, the monitor 16 issues a signal on connection 38 to the microprocessor 28 under the monitor alarm condition when the transmitter 10 is being disabled by the monitor. This signal causes the microprocessor 28 to immediately stop the storage of new data from the data scan operations. This causes the data collected in the data measuring scan operations, up to the instant of monitor alarm, to remain stored in the local data store 36. Thus, the preferred mode of operation is to provide for a continuous scanning by the multiplex switch 20, with successive scans being initiated at predetermined brief intervals, and a continuous storage of the operating condition data, as it is taken, in the local data store 36, with a constant up-dating of the stored data. Thus, as the measurements proceed on a particular scan, the most recent reading for a particular point automatically replaces the reading for that point which was previously stored in the local data store 36.

The scan interrupt signal to the microprocessor 28 from the monitor on connection 38 interrupts the operations of the microprocessor for processing and storing new data. The microprocessor may also control the multiplex switch 20 through a connection 40 to stop the scanning operations. The microprocessor 28 is preferably capable of operation in many different modes as described more fully below. One of the control modes of operation of the microprocessor 28 is in controlling the navigation signal transmitter 10 through a connection schematically indicated at 42. For instance, the microprocessor 28 may receive a command on the data line 30 through the data processor 32 to restart the transmitter 10 after it has been disabled by the monitor 16. This command is carried out through the connection 42.

The microprocessor 28 is capable of being programmed to provide a number of different alternative modes of operation in taking and storing operation condition data, and preferably in continuously computing an optimized statistical analysis of that data for later transmission to the data processor 32 and collective data store 34. For instance, typically, and preferably, the operating data from a plurality of successive time-spaced scans is stored in the local data store. The time spacing is preferably related to the anticipated possible rate of change of the operating data values, the successive scans being taken and recorded at intervals which are frequent enough to capture anticipated rates of operating condition change. The monitor 16, particularly when constructed in accordance with the teachings of U. S. Pat. No. 3,818,476 includes a built-in time delay means which is operable to determine how long a monitor alarm condition persists, and to transmit monitor alarm signals to the connections 18 and 38 only after the monitor alarm condition has persisted long enough so that it is clear that the out of limits signal condition was not merely a transient. Accordingly, as long as a sequence of operating condition data is recorded at intervals which are no longer than the time delay interval built into the monitor 16 for the detection of persistence of an out of limits condition, at least one sequence of data is certain to be recorded which indicates the conditions existing of the time of the monitor alarm which cause each disablement of the transmitter 10. This is in contrast to the prior arrangement previously described above in which a sequence of data is taken and recorded only after the emission of the monitor alarm signal from the monitor at the end of the built-in monitor persistence time delay. In a practical embodiment, the signals from the monitor 16 on lines 18 and 38 may be emitted from the same output line of the monitor 16.

FIG. 2 is a partial schematic diagram showing a modification of the upper left corner of the system of FIG. 1 in which separate delay elements are provided in the monitor alarm signal lines 18 and 38. In the modification of FIG. 2, the extra delays, indicated at 44 and 46 are provided for the purpose of further delaying the implementation of the disablement of the navigation signal transmitter 10 and of the continued cycling of the data reading sub-system until a time somewhat after the monitor has determined that there should be a bona fide monitor alarm, and shut-down of the system. This provides an additional interval for the data reading sub-system to record one or more additional sequences of data in order to provide a more complete history of the conditions giving rise to the monitor alarm. The delays provided by delay elements 44 and 46 may be identical, and consequently these delay elements may be combined in a single delay element with a common output signal connected to disable the navigation signal transmitter 10, and to discontinue the data reading sequence controlled by microprocessor 28. It is also within the scope of this invention to provide for a special mode of operation by the data reading sub-system in response to the signal on connection 38 from the monitor, in which a special data reading sequence is initiated in response to the monitor alarm condition, storing the additional operating condition data in a special pre-allocated section of the local data store 36 before discontinuing the data reading sequences.

Referring again to FIG. 1, as an alternative to providing the separate delay elements 44 and 45 of FIG. 2, it is within the scope of this invention to provide that the monitor alarm signal is issued on connection 38 from the monitor to the microprocessor after the monitor alarm condition has been first detected by the monitor 16, but before that alarm condition has persisted long enough to justify disabling the transmitter 10 by a signal on connection 18. Thus, the inherent delay built into the monitor 16 is used to give the data sub-system prior notice that a monitor alarm condition has begun. Thus, the microprocessor can cause the recordation of a final set of data in a special section of memory 36, if desired, before transmitter 10 is disabled. In such a modification, a second signal must be issued on connection 38 upon actual disablement, to confirm that an actual monitor alarm has occurred, and to stop the data sequence.

It is a very important feature of the present invention, in the preferred form thereof, that data processing capability is provided at a number of different levels of the system to provide an entire hierarchy of data handling elements. This provides a number of very important advantages including important economies in permitting the use of data links which do not require high speed capabilities; providing information in relatively concise form which compresses a large number of operating condition data readings into statistical summary form, a form which is capable of giving a true indication of the actual operating conditions with a minimum of data transmission.

In carrying out these data processing functions, the microprocessor 28 which serves as part of the data reading sub-system for a particular transmitter 10, may be programmed to provide a number of different functions. For instance, as it records sequences of actual data at predetermined time intervals, it may also preferably record a time reference number for each sequence of data, or for groups of data sequences. A clock 43 is provided for this purpose. Different sequences of data may be retained for unequally spaced past time intervals, a typical useful arrangement being the retention of readings for progressively increasing intervals in the past such as for 1 minute earlier, 2 minutes earlier, 4 minutes earlier, 8 minutes earlier, etc. Thus, the most recent data is regarded as the most pertinent, and the oldest data stored is regarded as least pertinent, but nevertheless providing a reference and setting for interpretation of the most recent data.

However, even more important, the microprocessor is capable of performing continuing arithmetic operations on the data, applying so called statistical methods to the analysis of the data. For instance, the microprocessor may be operated in conjunction with the local data store 36 to continuously compute and keep track of statistics such as maximum and minimum achieved values for each operating condition variable, moving averages of each operating condition varible, weighted moving averages of each variable, and occurrences of out of limits conditions for each variable. Such out of limits conditions may be determined on the basis of an instantaneous departure of greater than a predetermined percentage from the moving average value for that variable, or it may be related to predetermined fixed limits. Various other statistical functions of the operating data may be continuously and repeatedly derived and recorded.

Many different programming possibilities are available. For instance, the intervals at which data sequences are measured and stored may be automatically adjusted, based upon the analysis of the data to show rates of change, or occurrences of out of limits conditions. Thus, if a high rate of change is detected, or if out of limits conditions are detected, the time intervals between data sequences may be reduced automatically by the processor in order to provide a more complete record of the unusual conditions.

It is obvious that statistical summaries of the operating data, such as provided by moving averages, for instance, provide an extremely and efficient means for combining a large amount of operating data into a very meaningful combined form for later evaluation.

It is within the scope of this invention to omit the local data store 36 and to transmit all of the data taken by the sub-system directly on the connecting line 30 to the data processor 32 and the collective data store 34 for storage at that site. With such an arrangement, the microprocessor 28 may be replaced by a simpler control including a parallel to serial data converter. However, in accordance with the preferred form of the invention, the microprocessor 28 and local data store are used. The data processor 32 at the collective data site, from time to time requests the data previously stored on a real time basis in the local data store 36, and in response to that request, the collected data, including, and perhaps limited to, statistical analyses or summaries of the data, is transmitted over the line 30 to processor 32 for storage in the collective data store 34. Line 30 is generally a dedicated line, and may be a telephone line or a digital pulse data line.

From time to time, connections are established through a telephone line indicated at 48 to a central station computer and data storage equipment 50, which may be located at a great distance from the collective data store 34 and data processor 32. The telephone line 48 may be a dedicated line. However, it is preferably implemented on a more economical basis by simply using direct dialing long distance voice band communication links such as the standard telephone network. Connections may be automatically established, either upon initiation by the central station 50, or less frequently by initiation from the data processor 32. The central station computer 50 will generally have a manual control 52, by means of which a human operator may communicate through the central station computer with individual airport locations. Thus, the central station 50 is intended to serve many different airports represented by many different collective data stores 34 and data processors 32. The central station may also be connected to a remote data logger 54 which is capable of making a permanent record of data stored within the computer, and of making a log record of all communications from the central station computer to individual locations.

As indicated in FIG. 1, the collective data store 34 and data processor 32 are intended to be connected to a plurality of navigation signal transmitters. For instance, a connection 30A is shown to a microprocessor 28A, and thus to an entire operating condition data sub-system associated with a second navigation signal transmitter 10A. The basic configuration and operation of the sub-system associated with the navigation signal transmitter 10A, and the associated monitor 16A is exactly the same as the sub-system associated with the transmitter 10 and monitor 16 just described above. Accordingly, corresponding parts are correspondingly identified with the same numbers plus a suffix letter A, and the explanation of the operation of the system is not repeated again. The second sub-system is illustrated in order to illustrate the principle that there are typically a number of sub-systems connected to data processor 32 and the collective data store 34. The transmitters associated with these different sub-systems may perform different functions for the same airport runway such as, for instance, the glide slope function, and the localizer function for an instrument landing system. Furthermore, a distance marker beacon transmitter may constitute still another transmitter which is equipped with a data sub-system and monitor. Such a distance beacon may typically be what is referred to as middle marker. The capacity of the collective data store 34 and the data processor 32 may preferably be large enough to accommodate for all of the instrument landing system equipments installed at a large airport having many runways, and possibly having separate instrument landing system installations at both ends of certain runways to accommodate for landings in either direction on such runways. Furthermore, if desired, the collective data store 34 and data processor 32 may be arranged and connected to collect and store data from a number of airports, such as for all of the airports in a large metropolitan area such as New York City. However, it is believed to be preferable to confine the operations of the collective data store and associated data processor 32 to the navigation aid transmitters for a single airport.

While not illustrated separately, the connections 30 and 30A from processor 32 to the microprocessors 28 and 28A, and to other microprocessor sub-systems which are not illustrated are preferably combined in a single multi-drop party line with selective call-out from processor 32 to individual sub-systems.

The data processor 32 associated with the collective data store 34 preferably also deals with the operating condition data on a sophisticated statistical basis, not only storing periodically recorded data values, and statistical values previously computed and stored in the local data store 36, but also serving to perform statistical analyses upon the data, including functions such as: deviations from the mean value, rates of deviation, trends of change, time history of average trends, and other recognized arithmetic and statistical functions which have meaning in recording and indicating the operating status of the transmiters. Furthermore, the program of statistical analysis preferably provides a so-called prediction filter program which serves to indicate, based on prior experience with the apparatus, when the trends of the various operating conditions indicate a probability of failure within a short interval. The prediction filter program may follow the clasical principles of linear prediction filtering, or prreferably, the more recent "Kalman" filering, as taught for instance in a paper by R. E. Kalman entitled "A New Approach to Linear Filtering and Prediction Problems" published in March 1960 in the Journal of Basic Engineering of the Transactions of the American Society of Mechanical Engineers, Series D, Volume 82 at pages 35–45. The principles of Kalman filtering are also set forth in a section by R.E. Kalman entitled "New Methods in Weiner Filtering Theory" appearing at pages 370–388 of the "Proceedings of the First Symposium on Engineering Applications of Random Function Theory and Probability" published by John Wiley & Sons in 1963. Thus, service problems and difficulties may actually be anticipated, and service replacements may be sheduled to prevent the occurrence of shut-downs of individual transmitters. When the operations of the processor 32 indicate such a probability of failure, the processor 32 may initiate a call-out to the central station 50 over the telephone line 40 to thus notify the service organization of the impending risk of failure.

Similarly, when there is actually a monitor alarm shut-down initiated by an individual transmitter monitor such as monitor 16, the associated microprocessor 28 initiates a call-out on the data line 30 to the data processor 32, which in turn calls up the central station 50 to notify the central station of the problem.

Alternatively, when the preferred multi-drop party line is used, the different sub-systems are rapidly polled in sequence. With that arrangement, the microprocessor having the monitor alarm does not actually initiate a call-out, but responds to the polling signal from processor 32 with an alarm response. Such a response, or any failure to communicate, which may be signaled for instance by a loss of modem tone, may be communicated to central station 50.

The data processor 32 also provides routine functions, including the storage of longer term operating condition data collected and stored from each transmitter at much more widely timed spaced intervals than the intervals accommodated by the microprocessor 28. Thus, for instance, the data processor 32 and collective data store 34 may typically call for, and store, operating data a number of times in each 24-hour period, and may preserve a particular set, or particular sets of such data in storage to be called for by the central station computer 50.

The central station computer 50 is preferably programmed to automatically establish routine connections from time to time to the various collective data store and data processor combinations 32 and 34 at various airports, and to call forth the data from those sources with respect to all of the transmitters at that particular airport. The central station computer is intended to go about these tasks automatically, without human intervention, unless operating difficulties are encountered. The central station computer is also capable of receiving emergency calls initiated from various airport locations, such as in response to monitor alarm shut-downs of particular transmitters. In such instances, the central station computer is programmed to provide an alarm to a human operator, including a printout, or other visual display, of information about the location and nature of the emergency. The central station computer also may serve as the interface for communications with the individual locations by the operator, through the manual control 52.

The operations of the central station computer may be limited to the maintenance of such communications with the individual airport locations, the interpretation of the meaning of emergency calls, and the routine retrieval and storage of operating data information. However, preferably, the central station computer includes programs designed to still further analyze the operating data and operating data statistics provided from the collective data store and date processor 34–32. Thus, the central station computer may preferably be a large general purpose computer with greater data processing capability than either the data processor 32 or the microprocessor 28 in the system.

It may be generally stated that the microprocessor 28, the data processor 32, and the central station computer 50, and associated memories and connected systems, represent a hierarchy of data processing components in which the simplest processing which is carried out on a real time basis is handled by the microprocessor 28; the intermediate processing, on a more sophisticated level, is handled by the data processor 32 for a number of transmitters at more widely spaced time intervals for each transmitter; and finally the most sophisticated data processing procedures are carried out by the central station computer at even less frequent intervals for each transmitter, but for a much greater number of transmitters. By means of this herarchy, a most thorough and most effective supervisory arrangement is provided for all of the navigation aid transmitters connected to the system with an absolute minimum in total requirements for data storage, data transmission, and data processing capacity.

Details of the present invention which are not specifically disclosed in the specification and drawings may be carried out in accordance with more specific disclosures appearing in the related U.S. patents and patent applications referred to above, and in accordance with standard practice as taught in the technical literature. For instance, with reference to data processors, data memories, and other digital data hardware required in the invention, the details may be carried out in accordance with known practice in the computer and data processing industry.

Specific components may be selected from those readily available from various equipment manufacturers. For instance, the multiplex switch 20 may be a standard analog multiplex available from General Instrument Corporation under their product designation AY-6-4016. Another workable selection for this component is the Digital Equipment Corporation multiplexer designated by their product number A126. The microprocessors 28 and 28A may be selected from any one of the following: Intel Corporation product 8008, Motorola MC-6800, or Digital Equipment Corporation M7341.

The above-mentioned Digital Equipment Corp. components are listed in the 1975–76 edition of the Digital Equipment Logic Handbook published prior to the filing of this application. The data processor 32 and the central computer 50 may be carried out by means of various commercially available general purpose computer structures. Preferably, in each case, the structures are chosen to be adequate for the job, but no larger or more expensive than necessary. Thus, for the data processor 32, one of the smaller versions of the Digital Equipment Corporation Model PDP-11 is adequate. The PDP-11 is described in a brochure entitled "PDP-11 120" bearing Indentification No. 113X-01270-1264-J-03-20 and published prior to 1975. For the central station 50, one of the larger versions of the Digital Equipment Corporation PDP-11 is suitable, or many other selections can be made including the IBM 370, and the Hewlett Packard HP-2100. Since the central station computer 50 can be time shared with other functions, it is possible to use a commercial time-sharing system which time shares a very large computer with other users, or to employ a general purpose computer which shares the functions of the present invention with other functions which are required by the user.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A data system for a plurality of navigation aid transmitters comprising
a separate operating condition data measurement sub-system for each of said transmitters,
each of said sub-systems including a separate data reading means and local data storage means,
said data reading means
including a mulitplex switch means connected to the associated transmitter for taking a plurality of operating condition measurements in squence in the form of analog voltage signals,
an analog to digital converter for converting said analog signals to digital signals,
said local data storage means being connected to said analog to digital converter for storing said set of conditions measurement, each of said sub-systems being operable to store a set of condition measurements comprising at least one complete sequence of said condition measurements, said data storage means being operable after storage of said complete set of condition measurements to continue to receive new condition measurements in sequence and to store said new condition measurements in place of corresponding condition measurements previously stored in a prior sequence so that said stored condition measurement are constantly up-dated in said local data storage means, each sub-system also including a radio signal monitoring receiver means arranged and positioned to monitor at least one signal from the associated radio transmitter, said monitor being connected to disable said transmitter by emitting a monitor alarm condition signal, said monitor including means for emitting a monitor alarm condition signal when at least one monitored signal from said transmitter departs from predetermined acceptable limits, a connection from said monitor to said data reading means operable to disable said data storage means under said monitor alarm condition to thereby preserve said up-dated condition measurements stored in said data storage means indicating the operating conditions at the time of said monitor alarm condition, means for receiving and collectively storing digital signals from each of said local data storage means for each of a plurality of said sub-systems, data transmission channel means connected from said sub-systems to said digital signal receiving and collective storing means, a central station operable for communication with said digital signal receiving and collective storing means, a communication channel means connected for providing communication from said digital signal receiving and collective storing means to said central station, said central station including data storage means for receiving data transmitted from said collective data storage means.

2. A system as claimed in claim 1 wherein
said local data storage means is operable to record reading time signals in conjunction with the individual data sequences.

3. A system as claimed in claim 1 wherein
said local data storage means is operable to store a set of condition measurements comprising a plurality of sequences of said condition measurements so that said up-dated condition measurements stored in said local data storage means at the time of a monitor alarm condition provide a history of operating conditions up to the time of the monitor alarm.

4. A system as claimed in claim 3 including
a time delay means operable to delay the disablement of said transmitter to permit the recordation of at least one complete sequence of said condition measurement after the detection of a monitor alarm condition, and means to delay the disablement of said local data storage means to thereby provide for recordation of at least one complete sequence of said condition measurements after the monitor alarm condition.

5. A system as claimed in claim 4 wherein
said sequence of condition measurements recorded after a monitor alarm condition is recorded in a separate section of said data storage means.

6. A system as claimed in claim 1 wherein
said digital signal receiving and collective storing means comprises a data processor operable for controlling the receiving and storing of said digital signals and a data storage apparatus for storing said signals.

7. A system as claimed in claim 6 wherein
said data processor is operable in conjunction with said collective data storage means to analyze said data signals so as to provide records of the operation of the associated transmitters which are more meaningful than the original operating condition measurements as indicators of future operating problems.

8. A system as claimed in claim 6 wherein
said means for receiving and collectively storing said digital signals is operable to receive and collectively store signals from each of said operating condition measurement systems at predetermined intervals.

9. A system as claimed in claim 8 wherein
said data transmission channel means connected from said sub-systems to said digital signal receiving and collective storing means comprises a multi-drop party line, communications being established by said digital signal receiving and collecting storing means sequentially addressing individual sub-systems for communication on said party line.

10. A system as claimed in claim 8 wherein
said data processor is operable to transmit stored data over said communication channel means to said central station in response to a request for said data from said central station.

11. A system as claimed in claim 10 wherein
said central station includes a computer for storing and processing and statistically analyzing data received from said collective storage means.

12. A system as claimed in claim 1 wherein
each of said operating condition data measurement sub-systems includes a micro-processor.

13. A system as claimed in claim 12 wherein
said micro-processor interconnects and controls the operations of said multiplex switch and said analog to digital converter and said local data storage means.

14. A system as claimed in claim 13 wherein
said micro-processor is operable in conjunction with said local storage means to perform statistical calculations with said operating condition measurements for use in rapid analysis of the operating history of the associated transmitter.

15. A data system for a plurality of navigation aid transmitters comprising,
a separate operating condition data measurement sub-system for each of said transmitters, each of said sub-systems being operable independent of sequence in initiation signals from an outside source and including a separate data reading means and a local data storage means, said data reading means including a multiplex switch means connected to the associated transmitter for taking a plurality of operating condition measurements in sequence in the form of analog voltage signals, each sub-system further including an analog to digital converter for converting said analog signals to digital signals, said local data storage means being connected to said analog to digital converter for storing said set of measurements, means for receiving and collectively storing said digital signals from each of said local data storage means for each of a plurality of said sub-systems, data transmission channel means connected from said sub-systems to said digital signal receiving and collecting storing means, a central station operable for communication with said digital signal receiving and collective storage means, a communication channel means connected for providing communication from said digital signal receiving and collective storing means to said central station, said central station including data storage means for receiving data transmitted from said collective data storage means, 16. A system as claimed in claim 15 wherein said digital signal receiving and collective storing means comprises a data processor operable for controlling the receiving and storing of said digital signals and a data storage apparatus for storing said signals.

17. A system as claimed in claim 16 wherein said data processor is operable in conjunction with said collective data storage means to analyze said data signals so as to provide records of the operation of the associated transmitters which are more meaningful than the original operating condition measurements as indicators of future operating problems.

18. A system as claimed in claim 16 wherein said means for receiving and collectively storing said digital signals is operable to receive and collectively store signals from each of said operating condition measurement systems at predetermined intervals.

19. A system as claimed in claim 18 wherein said data processor is operable to transmit stored data over said communication channel means to said central station in response to a request for said data from said central station.

20. A system as claimed in claim 19 wherein said central station includes a computer for storing and processing and statistically analyzing data received from said collective storage means.

21. A system as claimed in claim 15 wherein each of said operating condition data measurement sub-systems includes a microprocessor operable in conjunction with said local data storage means for storing data which relates only to the associated navigation aid transmitter.

22. A system as claimed in claim 21 wherein said microprocessor interconnects and controls the operations of said multiplex switch and said analog to digital converter and said local data storage means.

23. A system as claimed in claim 22 wherein said microprocessor is operable in conjunction with said local storage means to continuously compute and store mathematical functions of said operating condition measurements for use in rapid anaylsis of the operating history of the associated transmitter.

24. A system as claimed in claim 23 wherein said mathematical functions are statistical functions of said operating condition measurements.

25. A system as claimed in claim 20 wherein each of said operating condition data measurement sub-systems includes a microprocessor and a local data storage means for storing data which relates only to the associated navigation aid transmitter, said system providing a hierarchy of data storage and data processing functions with the real time data storage and processing functions being carried out by said microprocessor and said local storage means and the intermediate processing and storage functions being performed by said digital signal receiving and collective storage means and said associated data processor at timed intervals and the final data storing and processing functions being performed by said central station on the basis of data collected from each collective storage means at less frequent limed intervals.

26. A system as claimed in claim 16 wherein said data transmission channel means connected from said sub-systems to said digital signal receiving and collective storing means comprises a multi-drop party line, communications being established by said digital signal receiving and collective storing means sequentially addressing individual sub-systems for communication on said party line.

* * * * *

UNITED STATES PATENT AND TRADEMARK OFFICE
CERTIFICATE OF CORRECTION

PATENT NO. : 4,027,289
DATED : May 31, 1977
INVENTOR(S) : DONALD J. TOMAN

It is certified that error appears in the above-identified patent and that said Letters Patent are hereby corrected as shown below:

Column 5, line 47, "45" should read --46--.
Column 6, line 57, after "extremely" insert --useful--.
Column 7, line 60, insert --a-- before "middle".
Column 8, line 25, "transmiters" should read --transmitters--;
 line 31, "clasical" should read --classical--;
 line 32, "prreferably" should read --preferably--;
 line 33, "filering" should read --filtering--;
 line 47, "sheduled" should read --scheduled--.
Column 9, line 58, "herarchy" should read --hierarchy--.
Column 10, line 31, "Indentification" should read --Identification--;
 line 60, "mulitplex" should read --multiplex--;
 line 62, "squence" should read --sequence--;
 line 68, "conditions measurement" should read --condition measurements--.
Column 11, line 11, "measurement" should read --measurements--;
 lines 64 and 65, "measurement" should read --measurements--.
Column 12, line 33, "collecting" should read --collective--;
 line 64, omit "in" after "sequence".
Column 13, line 15, "collecting" should read --collective--.

UNITED STATES PATENT OFFICE
CERTIFICATE OF CORRECTION

Patent No. 4,027,289     Dated May 31, 1977

Inventor(s) Donald J. Toman

It is certified that error appears in the above-identified patent and that said Letters Patent are hereby corrected as shown below:

Column 14, line 41, "limed" should read -- timed --.

Signed and Sealed this twenty-third Day of August 1977

[SEAL]

Attest:

RUTH C. MASON
Attesting Officer

C. MARSHALL DANN
Commissioner of Patents and Trademarks